(12) United States Patent
Palenius

(10) Patent No.: US 7,151,761 B1
(45) Date of Patent: Dec. 19, 2006

(54) CODE RESERVATION FOR INTERFERENCE MEASUREMENT IN A CDMA RADIOCOMMUNICATION SYSTEM

(75) Inventor: Torgny Palenius, Löddeköpinge (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/525,898

(22) Filed: Mar. 15, 2000

Related U.S. Application Data

(60) Provisional application No. 60/125,246, filed on Mar. 19, 1999.

(51) Int. Cl.
H04B 7/216 (2006.01)
H04B 1/60 (2006.01)

(52) U.S. Cl. ............... 370/335; 455/67.11; 455/67.13

(58) Field of Classification Search ........... 455/63.1, 455/67.11, 67.13, 68, 226.1, 226.2, 226.3, 455/278.1, 296, 115.1, 115.2, 115.3; 370/252, 370/248, 249, 251, 320, 335, 342
See application file for complete search history.

(56) References Cited

U.S. PATENT DOCUMENTS

| | | | | |
|---|---|---|---|---|
| 5,420,850 A | * | 5/1995 | Umeda et al. | 455/443 |
| 5,428,818 A | * | 6/1995 | Meidan et al. | 455/436 |
| 5,430,760 A | * | 7/1995 | Dent | 455/63.1 |
| 5,583,851 A | * | 12/1996 | Kato et al. | 370/342 |
| 5,784,406 A | * | 7/1998 | DeJaco et al. | 455/67.14 |
| 5,805,584 A | | 9/1998 | Kingston et al. | |
| 5,995,811 A | * | 11/1999 | Watanabe | 455/115.1 |
| 6,006,073 A | * | 12/1999 | Glauner et al. | 455/67.11 |
| 6,097,957 A | * | 8/2000 | Bonta et al. | 455/67.13 |
| 6,118,767 A | * | 9/2000 | Shen et al. | 370/252 |
| 6,137,991 A | * | 10/2000 | Isaksson | 455/67.11 |
| 6,356,763 B1 | * | 3/2002 | Kangas et al. | 455/456.1 |
| 6,490,266 B1 | * | 12/2002 | Kim | 455/67.14 |
| 6,542,484 B1 | * | 4/2003 | Ovesjo et al. | 370/335 |
| 6,665,334 B1 | * | 12/2003 | Wichman et al. | 375/148 |
| 6,700,881 B1 | * | 3/2004 | Kong et al. | 370/335 |

FOREIGN PATENT DOCUMENTS

| | | |
|---|---|---|
| EP | 0989686 A | 3/2000 |
| JP | 08125655 A | 5/1996 |
| WO | WO99/30441 | 6/1999 |
| WO | WO00/02397 | 1/2000 |

* cited by examiner

*Primary Examiner*—Andrew C. Lee
(74) *Attorney, Agent, or Firm*—Potomac Patent Group PLLC

(57) ABSTRACT

Methods and structures for quickly and accurately measuring interference associated with a received signal in a CDMA radiocommunication system are described. Interference measurement is performed by despreading a received signal using a channelization code which is reserved from a finite set of orthogonal channelization codes. The reserved code is not used (or is rarely used) for spreading traffic and, therefore, provides an estimate of the interference associated with a received signal when a receiver correlates the received signal with the reserved code.

24 Claims, 6 Drawing Sheets

| User A | 10 | 10 | 10 | 10 | 10 | 10 | 10 | 10 | 10 | 10 | 10 | 10 | 10 | 10 | 10 | 10 |
| User B |  |  | 1100 |  | 1100 |  | 1100 |  | 1100 |  | 1100 |  | 1100 |  | 1100 |  |
| User C | 11111111 |  |  |  | 11111111 |  |  |  | 11111111 |  |  |  | 11111111 |  |  |  |

US 7,151,761 B1

CODE RESERVATION FOR INTERFERENCE MEASUREMENT IN A CDMA RADIOCOMMUNICATION SYSTEM

PRIORITY AND RELATED APPLICATIONS

This application claims priority from U.S. Provisional Patent Application Ser. No. No. 60/125,246, filed on Mar. 19, 1999, entitled "Method for Interference Measurement in a DS-CDMA System", the disclosure of which is expressly incorporated herein by reference. This application is related to U.S. patent application Ser. No. 09/184,509 now U.S. Pat. No. 6,373,878 entitled "Using a Fast AGC as Part of SIR Calculation", filed on Nov. 2, 1998 to Palenius et al, the disclosure of which is also expressly incorporated herein by reference.

BACKGROUND

The present invention relates generally to radio communication systems and, more particularly, to techniques and structures for measuring interference associated with a signal received in a code division multiple access (CDMA) system.

Traditionally, radio communication systems have employed either Frequency Division Multiple Access (FDMA) or Time Division Multiple Access (TDMA) to allocate access to available radio spectrum. Both methods attempt to ensure that no two potentially interfering signals occupy the same frequency at the same time. For example, FDMA assigns different signals to different frequencies. TDMA assigns different signals to different time slots on the same frequency. TDMA methods reduce adjacent channel interference through the use of synchronization circuitry which gates the reception of information to prescribed time intervals.

In contrast, CDMA systems allow interfering signals to share the same frequency at the same time. More specifically, CDMA systems "spread" signals across a common communication channel by multiplying each signal with a unique spreading code sequence. The signals are then scrambled and transmitted on the common channel in overlapping fashion as a composite signal. Each mobile receiver correlates the composite signal with a respective unique despreading code sequence to thereby extract the signal addressed to it.

The signals which are not addressed to a mobile receiver in CDMA assume the role of interference. To achieve reliable reception of a signal, the ratio of the signal to the interference should be above a prescribed threshold for each mobile station (referred to as a "required signal-to-interference" level, or $SIR_{req}$). For example, as shown in FIG. 1A, consider the case where three mobile stations receive, respectively, three signals from a common CDMA communication band. Each of the signals has a corresponding energy associated therewith—namely energy levels E1, E2 and E3, respectively. The communication band also contains a certain level of noise (N). For the first mobile station to receive its intended signal, the ratio between E1 and the aggregate levels of E2, E3 and N should be above the first mobile's required signal-to-interference ratio.

To improve the signal-to-interference ratio for a mobile, the energy of the signal is increased to appropriate levels. However, increasing the energy associated with one mobile station increases the interference associated with other nearby mobile stations. As such, it is desirable for the radio communication system to strike a balance between the requirements of all mobile stations sharing the same common channel. A steady state condition is reached when the SIR requirements for all mobile stations within a given radio communication system are satisfied. Generally speaking, the balanced steady state may be achieved by transmitting to each mobile station using power levels which are neither too high nor too low. Transmitting messages at unnecessarily high levels raises interference experienced at each mobile receiver, and limits the number of signals which may be successfully communicated on the common channel (i.e., it reduces system capacity).

Once a steady state condition is achieved, adjustments are made for various changes within the mobile communication system. For instance, when a new mobile station enters a communication cell, it creates additional interference within the system. For example, as illustrated in FIG. 1B, the introduction of a fourth mobile station to the steady state condition depicted in FIG. 1A imposes a new signal on the common communication channel with energy E4. This new signal energy E4 adds to the aggregate interference experienced by the first through third mobile stations already in the cell. Accordingly, in order to satisfy the required signal-to-interference ratios of the first through third stations, the power associated with the first three mobile stations E1–E3 may have to be adjusted accordingly. The same disruptive effect may be experienced when a mobile station which was previously located within the boundaries of the radio communication cell switches from a passive state to an active state to transmit or receive a message on the common channel.

The steady state condition is also disrupted when a mobile station leaves the radio communication cell. For example, if the steady state condition shown in FIG. 1A is disrupted by the third mobile station leaving the radio communication cell, the signal-to-interference ratio of the remaining two mobile stations are improved by the absence of the energy E3 on the common channel, as shown in FIG. 1C. Accordingly, the power of signals E1–E2 can be decreased to ensure efficient use of the common communication channel. Again, this same effect may be achieved when the third mobile station within the radio communication cell switches from active to passive state (e.g. by terminating its call).

Still another disruption of the steady state may occur when one or more mobile stations within a radio communication cell changes its operating characteristics. For example, as illustrated in FIG. 1D, if the third mobile station switches from a low data-rate mode of communication to a high data-rate mode of communication, the remaining two mobile stations within the cell experience increased levels of interference. To counteract the increased levels of interference in the communication band, the system may have to adjust the power levels E1 and E2. The reverse effect may occur when a mobile station switches from a high data-rate mode to a low data-rate mode.

Prior CDMA-based systems use one or more power control loops to appropriately adjust the power levels of signal transmissions within the system in order to counteract the above-described disruptions to the steady state condition. According to one exemplary prior technique, for the downlink the mobile station monitors the strength at which it receives signals from the base site. If the signals are too weak, the mobile station transmits a message to its associated base station informing the base station to increase the power at which it transmits to the mobile station. The base station responds accordingly. However, over time, the base "teases" the mobile station by slowly decreasing the power to the mobile station until the base station is informed by the mobile station to once again increase the power of transmission to the mobile station. This ensures that the base station is not communicating with the mobile stations using power levels which are unnecessarily high.

For example, in the case of FIG. 1B where a fourth mobile station enters a cell, the other mobile stations may instruct the base station to increase the level of power to the mobile stations. The base station responds accordingly by increasing the power by one increment. If still insufficient to satisfy the mobile station's SIR requirements, i.e., the signal-to-interference after the combiner stage in the base station, the mobile stations repeat their message to the base station, once again requesting the base station to increase the level at which it transmits messages to the mobile stations. This procedure may be repeated through a series of communications between the base and the mobile stations. If the base "overshoots" the power requirements of the mobile stations, it may have to decrease the power levels to the mobile stations.

In order to achieve and maintain this desired steady state condition, a method is needed to quickly and accurately measure a mobile station's signal-to-interference ratio. In a system employing wideband code division multiple access (WCDMA), channels are commonly transmitted from one base station using orthogonal channelization codes and the same scrambling codes; therefore, in making a SIR determination in such a WCDMA system, one should not only consider the interference from the base station which is orthogonal to the wanted signal, but also the interference from other base stations which is non-orthogonal to the wanted signal. When a signal is despread and combined at a mobile station, one skilled in the art will appreciate that the interference that is orthogonal to the wanted signal does not corrupt the signal. However, this cannot be said of the interference that is non-orthogonal to the wanted signal. Therefore, it is important to consider this non-orthogonal interference in estimating the mobile station's SIR.

Several methods exist for measuring the interference power associated with a received signal. According to a first approach, the searcher of the RAKE receiver generates an impulse response estimate of the received signal. The impulse response estimate is produced by, for example, match filtering the received signal with a signal that is known by the receiver to be included in the transmitted signal (i.e., the pilot signal). All received power, excluding the peaks, is used to estimate the interference. This concept is graphically depicted in FIG. 2, but suffers from the drawback of being slow and is also insensitive to the orthogonality or lack of orthogonality of the interference.

A second approach involves estimating the received power after despreading and combining of the pilot symbols. Assuming that the received signal power is constant for some period of time, the variance of the interference corrupting the signal can be estimated. This estimation is accomplished by using the mean value of the received despread and combined pilot symbols to calculate the distance from each sample of despread and combined pilot symbols to this mean value. Using these "noise vectors", the variance of the interference can be estimated. This approach includes the orthogonality aspect if the measurement is done for all paths considered in the despreading process. However, it relies on the existence of a pilot symbol. If the pilot symbols are time-multiplexed, and thus discontinuously transmitted, the measurement can only be made when the pilot symbols are transmitted thereby resulting in intermittent SIR calculations. Another possible problem associated with this approach is that since the duty cycle is less than 100%, it may not be possible to do continuous estimation which may be required for, e.g., power control.

A third method for determining the interference associated with a received signal involves correlating the received signal with the channelization code allocated to the connection during a time when nothing is being transmitted to the mobile station. Since there is no "wanted" signal, despreading the received signal would then yield a good estimate of the interference. A problem with this approach is that the mobile station has to know when no information is being transmitted to it. This could be solved by having predetermined time-instants of no transmission, but such a solution has a certain capacity loss, since the interference measurement would need to be updated quite regularly.

In the above-identified, related application, a relatively fast automatic gain control (AGC) unit is implemented in a receiver that keeps incoming power to the RAKE at a constant level. This, in turn, enables the SIR to be calculated by multiplying the despread pilot symbol with a constant.

However, there continues to exist a problem in how to quickly and accurately measure interference in CDMA systems, particularly WCDMA systems, which takes into consideration signal interference which is both orthogonal and non-orthogonal to the wanted signal.

SUMMARY

The present invention seeks to overcome the above-identified deficiencies by providing methods and structures for quickly and accurately measuring interference associated with a received signal in a CDMA radiocommunication system. According to exemplary embodiments of the present invention, interference measurement is performed by despreading a received signal using a channelization code which is reserved from a finite set of orthogonal channelization codes. The reserved code is not used (or is rarely used) for spreading traffic and, therefore, provides an estimate of the interference associated with a received signal when a receiver correlates the received signal with the reserved code. Applicant further demonstrates that reserving at least one code for interference measurement purposes is feasible without unduly reducing system capacity.

BRIEF DESCRIPTION OF THE DRAWINGS

The above objects and features of the present invention will be more apparent from the following description of the preferred embodiments with reference to the accompanying drawings, wherein.

DETAILED DESCRIPTION

The following detailed description provides a discussion of various exemplary embodiments which are intended to illustrate, rather than restrict, the scope of the present invention. Thus, reference to specific types of systems, circuits, etc. is intended only to provide an example of such features as they may be employed in conjunction with the present invention. Likewise, details regarding other system features, circuit schematics and the like that are well known to those skilled in the art are omitted to avoid obscuring the present invention.

Figure 1A:
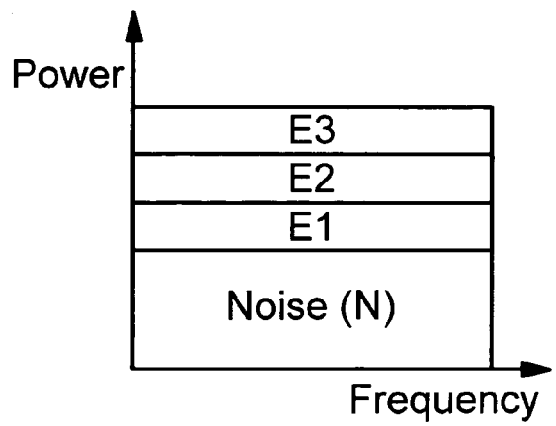
FIG. 1A shows an exemplary distribution of signal energies within a common band in a steady state condition.
Figure 1B:
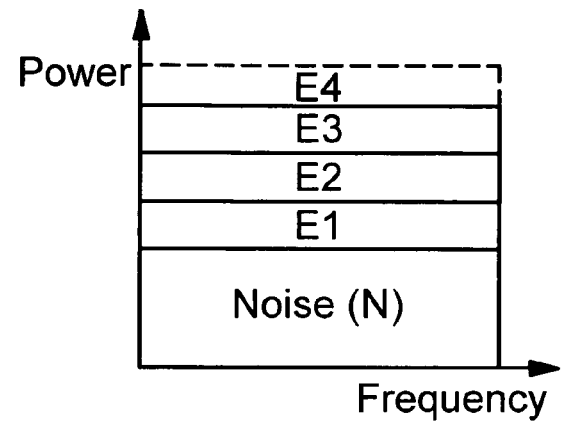
FIG. 1B shows an exemplary distribution of signal energies within a common band after the introduction of a new mobile station.
Figure 1C:
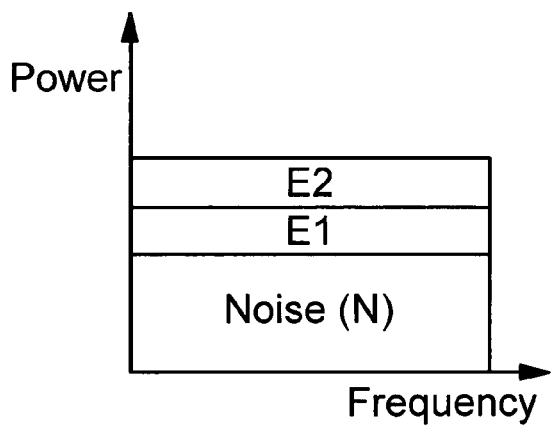
FIG. 1C shows an exemplary distribution of signal energies within a common band after the removal of a mobile station.
Figure 1D:
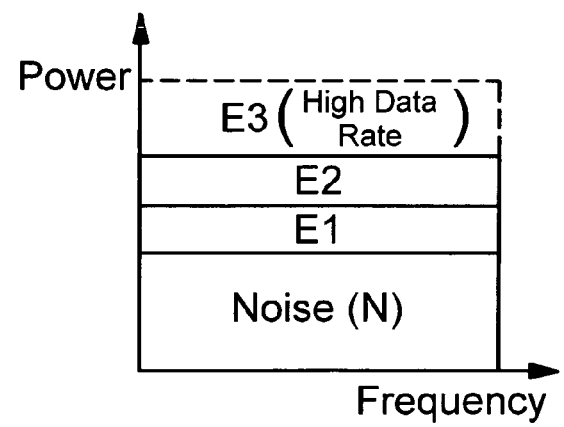
FIG. 1D shows an exemplary distribution of signal energies within a common band after a mobile station switches from low to high data-rate mode.
Figure 2:
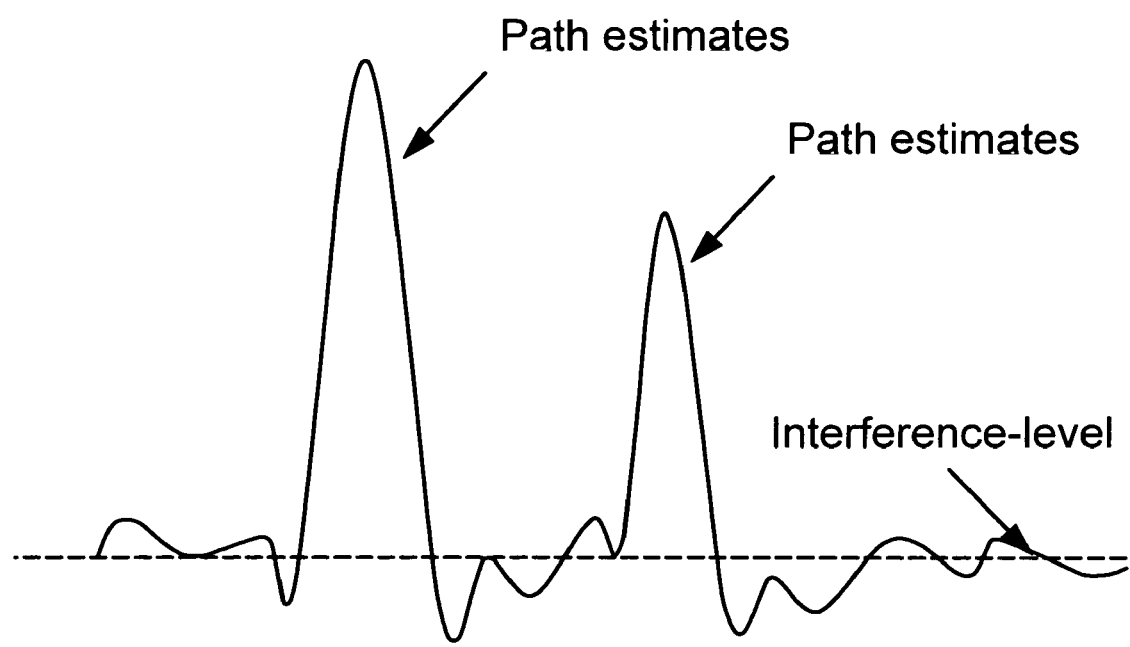
FIG. 2 is a graph which provides an example of an impulse response generated by a searcher as part of a conventional technique for measuring interference.
Figure 3:
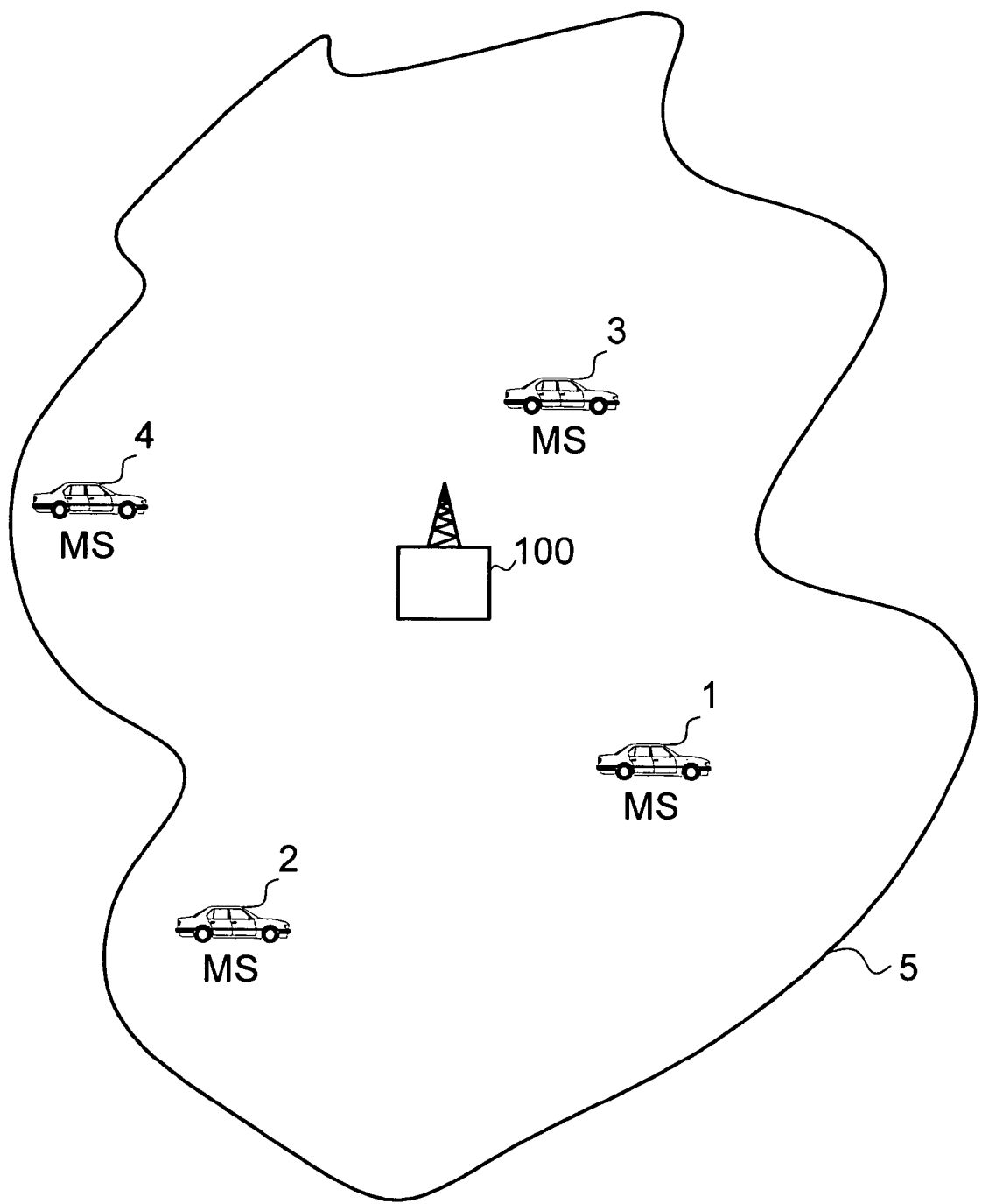
FIG. 3 is a cell diagram illustrating a base station and several mobile stations.

Consider the exemplary situation depicted in FIG. 3. Therein, a base station 100 is currently handling connections with three mobile stations, M1, M2 and M3. For the purposes of this exemplary embodiment, consider that the system depicted in FIG. 3 operates using a WCDMA technology with duplexed downlink (i.e. base-to-mobile direction) and uplink (i.e. mobile-to-base direction) channels.

In the downlink, base station 100 transmits to each of mobile stations M1, M2 and M3 using a certain power level associated with each of these mobile stations. The exemplary signals, transmitted from the base station 100, are spread using orthogonal code words. In the uplink, mobile stations M1, M2 and M3 communicate with base station 100, each using a certain power level. Although not shown, the base station 100 is in communication with a radio network controller (RNC), which in turn is connected to a public switched telephone network (PSTN).

The transmission of signals in the exemplary WCDMA system depicted in FIG. 3 can be characterized as follows. An information data stream to be transmitted is first multiplied with a channelization code and then with a scrambling code. The information data stream and the scrambling code can have the same or different bit rates. The information data stream and the scrambling code are combined by multiplying the two bit streams together. Each information data stream or channel is allocated a unique channelization code. According to the present invention, the unique channelization code is a unique orthogonal code word. A plurality of coded information signals are transmitted on radio frequency carrier waves and jointly received as a composite signal at a receiver. Each of the coded signals overlaps all of the other coded signals, as well as noise related signals, in both frequency and time.

At the mobile station, the received composite signal is processed to produce an estimate of the original message. This process is known as demodulation. Demodulation is commonly performed by a RAKE receiver which is a type of receiver where several propagation paths can be detected and combined, or "raked", together before decoding. These different propagation paths of a radio signal occur, for example, because of reflections from buildings or other large nearby obstacles. This combination or "raking" is an advantageous way of utilizing as much of the transmitted energy as possible in the detection of the wanted signal.

The composite signal is despread by the receiver using user-specific spreading codes related to a particular transmitted signal which is to be retrieved. When user-specific spreading codes are orthogonal to one another, the received signal can be correlated with a particular user spreading code such that only the desired signal related to a particular spreading code is enhanced while the other signals for all the other users which are orthogonal to the wanted signal are not enhanced.

Figures 4, 5:
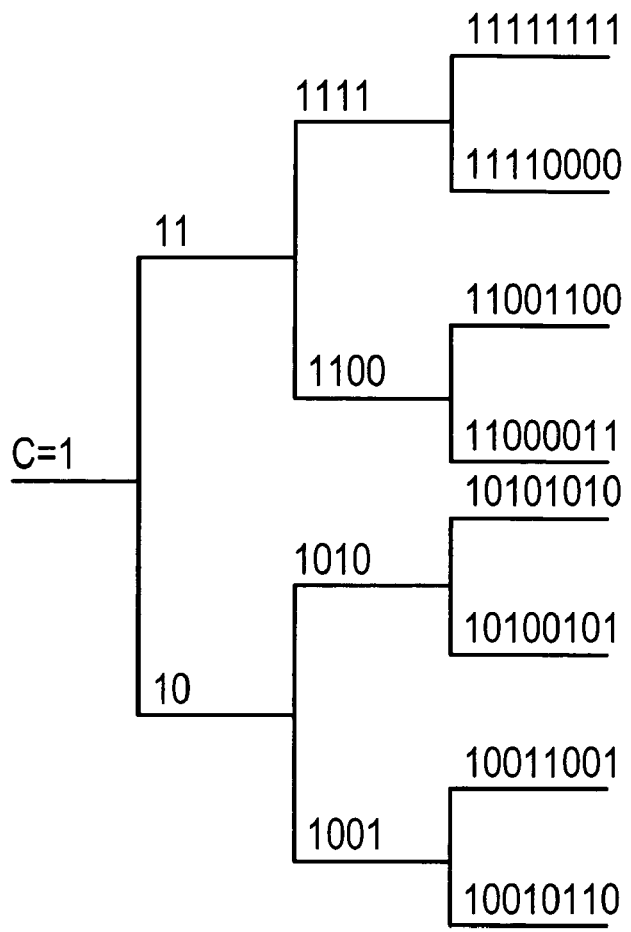
FIG. 4 is an exemplary orthogonal variable spreading factor code tree.
FIG. 5 depicts orthogonal selections from the code tree of FIG. 4.

Orthogonal Variable Spreading Factor (OVSF) codes are used in order to maintain link orthogonality while still allowing for different user data rates to be accommodated. The OVSF scheme may be described by a code-tree an example of which is shown in FIG. 4. Therein, a binary alphabet and mother code of "1" is assumed, although the concept can be generalized. Each level in the tree provides a set of codes that are orthogonal to each other. For example, the 3rd level consists of the codes "1111", "1100", "1010" and "1001", each of length 4. Thus a CDMA system employing this code tree can support four simultaneous orthogonal users using codes of Spreading Factor (SF) 4. Alternatively, it could support eight simultaneous orthogonal users of SF=8 (next level in the code-tree) etc. Since the chip rate in a DS-CDMA system is typically constant, a higher SF generally corresponds to a lower information bit-rate.

However, it is also desirable to support a plurality of simultaneous orthogonal users with different information bit rates, i.e., different SF values. This can be accomplished using the same code as long as a code at a certain "branch" in the code-tree is used if and only if no code on the path leading to the root of the tree is used. This restriction on code selection from the tree preserves orthogonality between the selected codes used in a cell. An example will serve to illustrate this point. FIG. 5 depicts the usage of three different channelization codes ("10", "1100" and "11111111") used to spread the information bits associated with the data stream for three different users. These three different channelization codes provide three different spreading factors, which correspond to three different user information bit rates. Whichever of these three rates is being detected (de-spread) in a receiver, the other two will always be orthogonal, assuming that they are transmitted synchronously. For instance, when de-spreading the slowest symbol rate signal ("11111111"), the eight chips of each symbol are simply accumulated, and the accumulated contribution from the other two signals during the eight chips will be identically zero (in "1"/"−1" representation, corresponding to BPSK modulation of the "1"/"0" bits).

When an OVSF tree is used for channelization in the forward link, it might be assumed that there is no interference to a user's desired information signal in the forward link except for the ever-present thermal noise. In fact, if the radio channel's impulse response consists of a single path, there is no interference from other user's signals associated with signals transmitted by the same base station, i.e., there is no intra-cell interference. The interference then consists only of signals transmitted from surrounding cells (i.e., inter-cell interference) and thermal noise. If, however, the radio channel's impulse response consists of a plurality of paths, there will however be intra-cell interference as well. This is due to the fact that the received signal will include a plurality of time-shifted echoes of the transmitted signal, and the contributions from echoes in the de-spreading process will not sum to zero, since the echoes are not synchronized to the de-spreading process.

Figure 6:
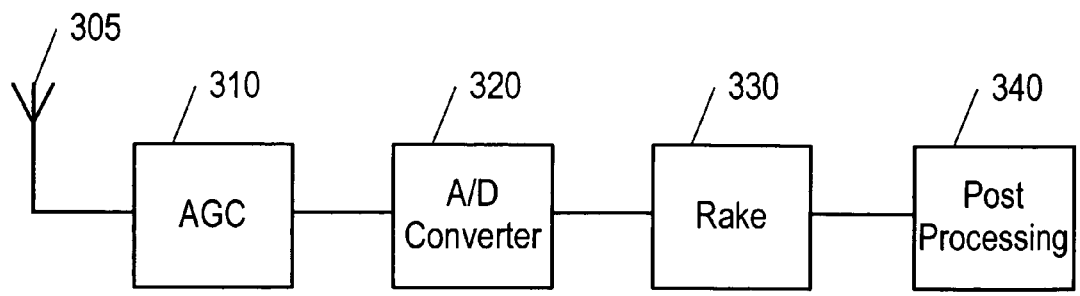
FIG. 6 illustrates an exemplary mobile station into which the interference measurement techniques of the present invention may be incorporated.

FIG. 6 illustrates an exemplary mobile station into which the interference measurement technique of the present invention can be implemented. In FIG. 6, the mobile station includes an antenna 305 for receiving a transmitted analog signal, an automatic gain controller (AGC) 310 for adjusting the power of the received analog signal to a desired level, an analog-to-digital (A/D) converter 320 for converting the adjusted analog signal to a digital signal and a RAKE receiver 330 for isolating and combining individual rays of the received signal. One skilled in the art will appreciate that, in the alternative, the received signal could be a digital signal. This would obviate the need for an A/D converter. In such an event, the output of the AGC 310 would be directly transferred to the RAKE receiver 330. Once combined, the signal is subjected to post processing 340. One skilled in the art will appreciate that the mobile station illustrated in FIG. 6 includes additional circuitry (not shown) which aids in the sending, receiving and processing of data.

As indicated above, the mobile station receives an analog signal which includes both the signal intended for the mobile station and interference. The power of the received signal (RS) includes the power of the received wanted signal (S) and the power of any existing interference from the same base station that is orthogonal to the wanted signal ($I_{ORTH}$). In addition, the power of the received signal includes the power of any noise and interference from other base stations that are non-orthogonal to the wanted signal ($I_{NONORTH}$). The following equation illustrates this relationship:

$$RS = S + I_{ORTH} + I_{NONORTH}. \quad (1)$$

In the RAKE receiver 330, the digital signal is despread by multiplying the signal with the unique orthogonal code word associated with the particular mobile station, e.g., a code selected from the code tree of FIG. 4 to provide a desired data rate while maintaining orthogonality. As a result, the amplitude of the wanted signal increases and the orthogonal part of the interference disappears. The power of the rest of the interference (i.e., that interference which is non-orthogonal) is not changed.

Figure 7:
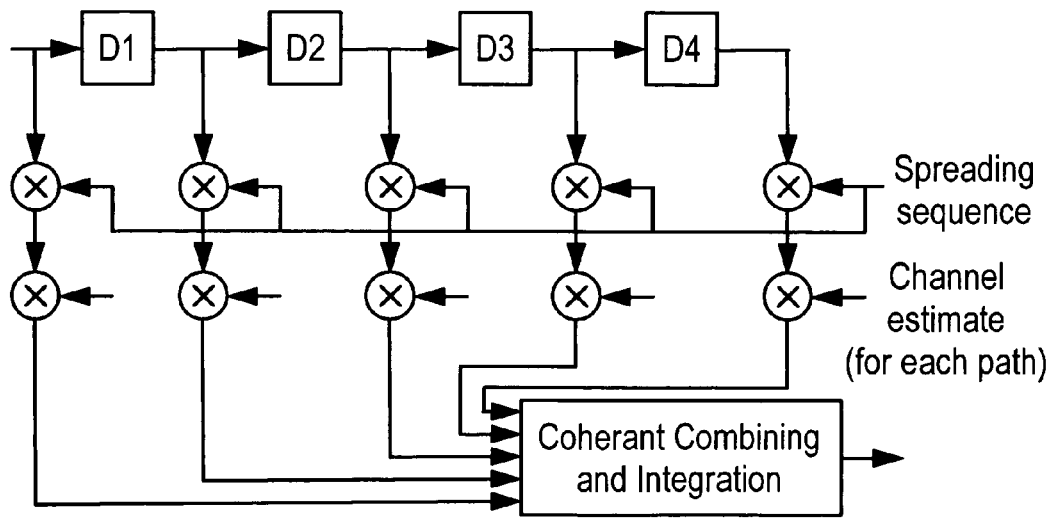
FIG. 7 illustrates the RAKE receiver unit of FIG. 6 in more detail.

FIG. 7 illustrates the operation of an exemplary RAKE receiver. In FIG. 7, the received signal is delayed corresponding to each measured path in order to make the paths time aligned. The selection of one or more paths for despreading by so-called RAKE "fingers" can be performed according to any one of a plurality of techniques which will be known to those skilled in the art. Thereafter, each path is despread with the spreading sequence and multiplied with the complex conjugate of the channel estimate which weighs the importance and aligns the phases of the different paths. Finally, the paths are combined.

According to exemplary embodiments of the present invention, the RAKE receiver of FIG. 7 can also be used to generate an estimate of the interference associated with the received signal by despreading the received signal with a reserved interference measurement code. Since the reserved interference measurement code is never (or at least not typically) transmitted in the forward link, by correlating the received forward link signal with the reserved code, the result would be an estimate of the interference including intra-cell interference, inter-cell interference and thermal noise. If this correlation is performed for each selected path in the de-spreading process, a good estimate of the interference per path is obtained.

Applicant recognizes that a potential drawback of this scheme would be a risk of orthogonal channelization code shortage. However, in a typical system, there would typically exist so called Common Control Channels (CCCH), that are relatively low rate and would thus be carried on physical channels (i.e., using channelization codes) that have a relatively large SF, e.g., an SF of 256. In addition to these common control channels, it may also be possible to set up dedicated channels of very low information bit-rate. Therefore, it is likely that the "bottom" of the code-tree will be at SF=256 or higher. Thus an SF=256 code or higher can be reserved as the interference-measurement code, which reservation would not impose any significant loss of code resources. For example, assuming that there is a single physical channel with SF=256 carrying the Broadcast Control Channel (BCCH), the code disposed in the parallel sub-branch in the code tree having SF=256 could be reserved for the interference-measurement code. In this case, 1/256 (or less than 0.5%) of the channelization code resource would be reserved.

If multiple, parallel OVSF sets are used in a cell (either by the use of multiple different OVSF sets or multiple versions of the same OVSF set but with multiple scrambling codes), there can be one interference measurement code reserved for each set. All mobile stations can be notified of the code(s) reserved for interference measurement by transmitting information identifying the measurement code(s) on a broadcast channel, e.g., the BCCH or a dedicated control channel. Alternatively, the reserved code can be prespecified and stored in terminal memory such that it is known by all terminals without the need to broadcast the code on a radio channel.

Figure 8:
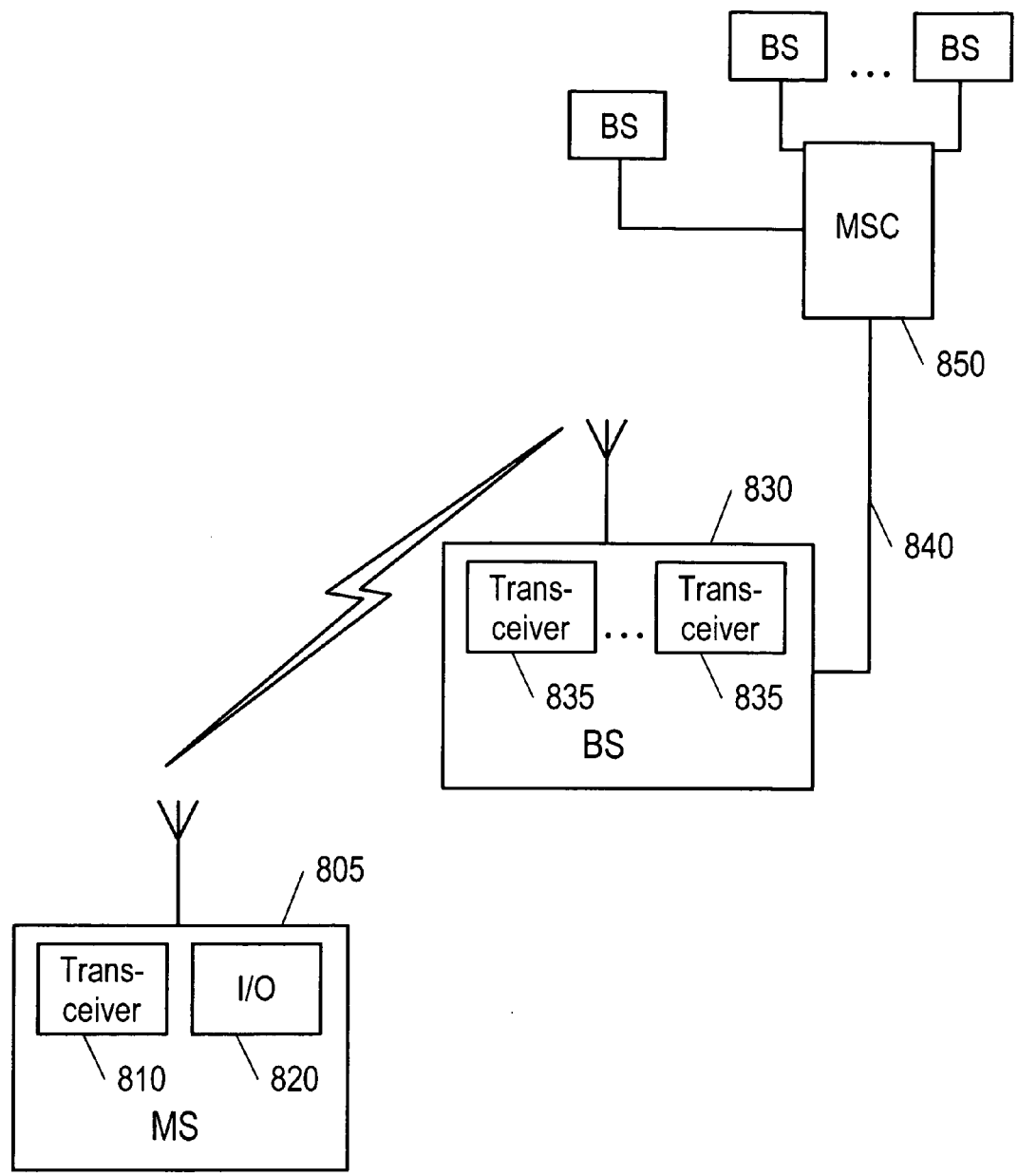
FIG. 8 is a block diagram of an exemplary radiocommunication system in which the present invention can be implemented.

FIG. 8 depicts other exemplary components of an exemplary radiocommunication system in which the present invention can be implemented. Wireless terminal 805 includes, among other functional units, a transceiver 810 for transmitting and receiving radio signal over an air interface via traffic and control channels using techniques which will vary depending upon the type of radiocommunication system with which it is communicating. Additionally, various I/O devices 820, e.g., a keyboard, a display and a speaker, are included in terminal 805 so that the device will be able to output information received over the air interface and permit the user to input information into the terminal. The terminal 805 will also typically include a processor and memory (not shown).

A mobile switching center (MSC) of a number of base stations which support radiocommunications with terminal devices. Depicted in FIG. 8 is a block diagram of one such base station (BS) 830 which transmits and receives information over the air interface from and to terminal 805. The base station 830 will typically have a number of transceiver units 835 so as to be able to support connections with many terminals simultaneously. The base station 830 is linked to the other portions of the fixed network via a communication link 840 which may, for example, be a PCM link connected to an MSC 850.

The foregoing has described the principles, preferred embodiments and modes of operation of the present invention. However, the invention should not be construed as being limited to the particular embodiments discussed above. For example, while the above-described embodiments utilized orthogonal spreading codes, one skilled in the art will appreciate that other spreading codes could be utilized without departing from the spirit and scope of the invention. Thus, the above-described embodiments should be regarded as illustrative rather than restrictive, and it should be appreciated that variations may be made in those embodiments by workers skilled in the art without departing from the scope of the present invention as defined by the following claims.

The invention claimed is:

1. A method for estimating interference in a radiocommunication system comprising the steps of:

reserving at least one code in a set of codes for interference measurement only such that said at least one code is never used for transmitting signals;

receiving a composite signal that was not spread by using said at least one reserved code; and estimating said interference at a receiver by correlating with said at least one reserved code.

2. The method of claim 1, further comprising the step of: broadcasting information identifying said at least one code to said receiver.

3. The method of claim 1, further comprising the step of: storing said at least one code in a terminal's memory.

4. The method of claim 1, wherein the at least one code is reserved within a communication cell to which the receiver belongs.

5. The method of claim 1, wherein the estimating comprises despreading the received composite signal using the reserved at least one code, and the despread result contains only interference with respect to the mobile station.

6. A mobile station comprising:
a receiver for receiving a composite signal over an air interface and despreading said signal using at least one channelization code;
a processor for providing said at least one channelization code to said receiver, said at least one channelization code including a reserved code that is used only to estimate interference associated with said received signal,
wherein said reserved code is never used for transmitting said signal.

7. The mobile station of claim 6, wherein said receiver receives information over said air interface that identifies said reserved code.

8. The mobile station of claim 6, wherein said at least one channelization code also includes a code associated with a traffic channel assigned to said mobile station.

9. The mobile station of claim 6, further comprising:
a memory for storing said reserved code.

10. The mobile station of claim 6, wherein the received signal does not contain data intended for the receiver and spread with the reserved code.

11. The mobile station of claim 6, wherein the reserved code is reserved within a communication cell to which the mobile station belongs.

12. The mobile station of claim 6, wherein the receiver despreads the received signal using the reserved code, and the despread result contains only interference with respect to the receiver.

13. A mobile station comprising:
a receiver for receiving a signal over an air interface and despreading said signal using at least one channelization code; and
a processor for providing said at least one channelization code to said receiver, said at least one channelization code including a reserved code that is used only to estimate interference associated with said received signal,
wherein said at least one channelization code also includes a code associated with a traffic channel assigned to said mobile station; and
wherein said code associated with said traffic channel is selected based upon a desired user bit rate for a connection between said mobile station and a radio-communication system.

14. A method for estimating interference in a system comprising a transmitter and a receiver, the method comprising the steps of:
reserving at least one code in a set of codes for interference measurement only, wherein the reserved at least one code is used within the system only to despread received signals and not to encode signals for transmission;
transmitting a signal that was not spread by using the reserved at least one code;
receiving the signal; and
estimating interference at the receiver by despreading the received composite signal using the reserved at least one code.

15. A method of estimating interference at a receiver in a communications system, the method comprising:
receiving a composite signal that includes a transmitted signal representing a data stream that has been spread by means of a first spreading code;
using the first spreading code to despread the composite signal and thereby retrieve the transmitted signal; and
estimating interference at the receiver by using a second spreading code to despread the composite signal, wherein the estimated interference represents interference that occurred during that part of the composite signal that includes the data stream,
wherein the second spreading code is reserved for interference measurement such that the second spreading code is not typically used for spreading traffic.

16. The method of claim 15, wherein the composite signal never includes a transmitted signal representing a data stream that has been spread by means of the second spreading code.

17. The method of claim 15, comprising:
prior to receiving the composite signal, receiving a transmitted signal that includes information identifying the second spreading code.

18. The method of claim 15, wherein each of the first and second spreading codes is an Orthogonal Variable Spreading Factor (OVSF) code selected from a code-tree.

19. The method of claim 18, wherein the second code has a spreading factor greater than or equal to 256.

20. A mobile unit for use in a communications system, the mobile unit comprising:
a receiver that receives a composite signal that includes a transmitted signal representing a data stream that has been spread by means of a first spreading code;
despreading logic that uses the first spreading code to despread the composite signal and thereby retrieve the transmitted signal; and
interference estimating logic that estimates interference at the receiver by using a second spreading code to despread the composite signal, wherein the estimated interference represents interference that occurred during that part of the composite signal that includes the data stream,
wherein the second spreading code is reserved for interference measurement such that the second spreading code is not used for spreading traffic.

21. The mobile unit of claim 20, wherein the composite signal never includes a transmitted signal representing a data stream that has been spread by means of the second spreading code.

22. The mobile unit of claim 20, comprising:
logic for retrieving, from a signal received prior to the composite signal, information identifying the second spreading code prior to receiving the composite signal.

23. The mobile unit of claim 20, wherein each of the first and second spreading codes is an Orthogonal Variable Spreading Factor (OVSF) code selected from a code-tree.

24. The mobile unit of claim 23, wherein the second code has a spreading factor greater than or equal to 256.

* * * * *